US011914861B2

(12) United States Patent
Colgrove

(10) Patent No.: US 11,914,861 B2
(45) Date of Patent: Feb. 27, 2024

(54) PROJECTING CAPACITY IN A STORAGE SYSTEM BASED ON DATA REDUCTION LEVELS

(71) Applicant: PURE STORAGE, INC., Mountain View, CA (US)

(72) Inventor: John Colgrove, Los Altos, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 17/508,695

(22) Filed: Oct. 22, 2021

(65) Prior Publication Data
US 2022/0043578 A1 Feb. 10, 2022

Related U.S. Application Data

(63) Continuation of application No. 16/555,417, filed on Aug. 29, 2019, now Pat. No. 11,163,448, which is a continuation of application No. 14/847,796, filed on Sep. 8, 2015, now Pat. No. 10,430,079.

(60) Provisional application No. 62/047,284, filed on Sep. 8, 2014.

(51) Int. Cl.
*G06F 3/06* (2006.01)

(52) U.S. Cl.
CPC ............ *G06F 3/0608* (2013.01); *G06F 3/067* (2013.01); *G06F 3/0641* (2013.01); *G06F 3/0689* (2013.01)

(58) Field of Classification Search
None
See application file for complete search history.

(56) References Cited

U.S. PATENT DOCUMENTS

| 5,208,813 | A  | 5/1993  | Stallmo        |
| 5,403,639 | A  | 4/1995  | Belsan et al.  |
| 5,940,838 | A  | 8/1999  | Schmuck et al. |
| 6,263,350 | B1 | 7/2001  | Wollrath et al.|
| 6,412,045 | B1 | 6/2002  | DeKoning et al.|
| 6,718,448 | B1 | 4/2004  | Ofer           |
| 6,757,769 | B1 | 6/2004  | Ofer           |
| 6,799,283 | B1 | 9/2004  | Tamai et al.   |
| 6,834,298 | B1 | 12/2004 | Singer et al.  |
| 6,850,938 | B1 | 2/2005  | Sadjadi        |
| 6,915,434 | B1 | 7/2005  | Kuroda et al.  |

(Continued)

FOREIGN PATENT DOCUMENTS

| CN | 103370685 A | 10/2013 |
| CN | 103370686 A | 10/2013 |

(Continued)

OTHER PUBLICATIONS

International Search Report & Written Opinion, PCT/US2015054522, dated Apr. 28, 2016, 11 pages.

(Continued)

*Primary Examiner* — Edward J Dudek, Jr.
*Assistant Examiner* — Ralph A Verderamo, III

(57) ABSTRACT

Adjusting storage capacity in a computing system that includes a computing device configured to send access requests to a storage device characterized by a first storage capacity, including: reducing data; determining, in dependence upon an amount of storage capacity saved by reducing the data, an updated storage capacity for the storage device; and exporting an updated storage capacity to the computing device.

20 Claims, 6 Drawing Sheets

(56) References Cited

U.S. PATENT DOCUMENTS

| | | |
|---|---|---|
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,975,115 B2 | 7/2011 | Wayda et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,200,887 B2 | 6/2012 | Bennett |
| 8,205,065 B2 | 6/2012 | Matze |
| 8,352,540 B2 | 1/2013 | Anglin et al. |
| 8,504,797 B2 | 8/2013 | Mimatsu |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,806,160 B2 | 8/2014 | Colgrove et al. |
| 8,822,155 B2 | 9/2014 | Sukumar et al. |
| 8,874,850 B1 | 10/2014 | Goodson et al. |
| 8,959,305 B1 | 2/2015 | LeCrone et al. |
| 9,026,752 B1 | 5/2015 | Botelho |
| 9,081,713 B1 | 7/2015 | Bennett |
| 9,152,333 B1 * | 10/2015 | Johnston ............ G06F 3/067 |
| 9,189,334 B2 | 11/2015 | Bennett |
| 9,280,678 B2 | 3/2016 | Redberg |
| 9,311,182 B2 | 4/2016 | Bennett |
| 9,395,922 B2 | 7/2016 | Nishikido et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 9,632,870 B2 | 4/2017 | Bennett |
| 10,108,644 B1 * | 10/2018 | Wigmore ............ G06F 16/214 |
| 10,324,639 B2 | 6/2019 | Seo |
| 10,430,079 B2 | 10/2019 | Colgrove |
| 10,567,406 B2 | 2/2020 | Astigarraga et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2004/0250010 A1 * | 12/2004 | Chen ............ G11C 7/1006 711/170 |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0168624 A1 | 7/2007 | Kaler |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0256141 A1 | 10/2008 | Wayda et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2010/0306500 A1 | 12/2010 | Mimatsu |
| 2011/0035540 A1 | 2/2011 | Fitzgerald et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0231172 A1 | 9/2011 | Gold |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0144149 A1 * | 6/2012 | Aronovich .......... G06F 11/3485 711/171 |
| 2012/0198175 A1 | 8/2012 | Atkisson |
| 2012/0246438 A1 * | 9/2012 | Aronovich .......... G06F 11/3442 711/E12.002 |
| 2012/0317333 A1 | 12/2012 | Yamamoto et al. |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 * | 2/2014 | Kimmel ............ G06F 3/0631 711/159 |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0136491 A1 * | 5/2014 | Nemoto ............ G06F 3/0641 707/692 |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0220561 A1 | 8/2014 | Sukumar et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0154418 A1 | 6/2015 | Redberg |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2015/0347024 A1 | 12/2015 | Abali et al. |
| 2015/0378613 A1 * | 12/2015 | Koseki ............ G06F 3/0635 711/103 |

(56) References Cited

U.S. PATENT DOCUMENTS

| | | |
|---|---|---|
| 2016/0019114 A1 | 1/2016 | Han et al. |
| 2016/0026397 A1 | 1/2016 | Nishikido et al. |
| 2016/0070482 A1 | 3/2016 | Colgrove |
| 2016/0098191 A1 | 4/2016 | Golden et al. |
| 2016/0098199 A1 | 4/2016 | Golden et al. |
| 2016/0182542 A1 | 6/2016 | Staniford |
| 2016/0248631 A1 | 8/2016 | Duchesneau |
| 2017/0024142 A1 | 1/2017 | Watanabe et al. |
| 2017/0262202 A1 | 9/2017 | Seo |
| 2018/0054454 A1 | 2/2018 | Astigarraga et al. |
| 2018/0081562 A1 | 3/2018 | Vasudevan |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0360833 A1 | 11/2021 | Alissa et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| EP | 3347807 A1 | 7/2018 |
| JP | 2007087036 A | 4/2007 |
| JP | 2007094472 A | 4/2007 |
| JP | 2008250667 A | 10/2008 |
| JP | 2010211681 A | 9/2010 |
| WO | 1995002349 A1 | 1/1995 |
| WO | 1999013403 A1 | 3/1999 |
| WO | 2008102347 A1 | 8/2008 |
| WO | 2010071655 A1 | 6/2010 |
| WO | 2017044136 A1 | 3/2017 |

OTHER PUBLICATIONS

Microsoft Corporation, "Fundamentals of Garbage Collection", Retrieved Aug. 30, 2013 via the WayBack Machine, 11 pages.

Microsoft Corporation, "GCSettings.IsServerGC Property", Retrieved Oct. 27, 2013 via the WayBack Machine, 3 pages.

Hwang et al., "RAID-x: A New Distributed Disk Array for I/O-Centric Cluster Computing", Proceedings of The Ninth International Symposium On High-performance Distributed Computing, Aug. 2000, pp. 279-286, The Ninth International Symposium on High-Performance Distributed Computing, IEEE Computer Society, Los Alamitos, CA.

Stalzer, "FlashBlades: System Architecture and Applications", Proceedings of the 2nd Workshop on Architectures and Systems for Big Data, Jun. 2012, pp. 10-14, Association for Computing Machinery, New York, NY.

Storer et al., "Pergamum: Replacing Tape with Energy Efficient, Reliable, Disk-Based Archival Storage", FAST'08: Proceedings of the 6th USENIX Conference on File and Storage Technologies, Article No. 1, Feb. 2008, pp. 1-16, USENIX Association, Berkeley, CA.

* cited by examiner

PROJECTING CAPACITY IN A STORAGE SYSTEM BASED ON DATA REDUCTION LEVELS

CROSS-REFERENCE TO RELATED APPLICATIONS

This is a continuation application for patent entitled to a filing date and claiming the benefit of earlier-filed U.S. Pat. No. 11,163,448, issued Nov. 2, 2021, herein incorporated by reference in its entirety, which is a continuation of U.S. Pat. No. 10,430,079, issued Oct. 1, 2019, which claims the benefit of U.S. Provisional Application No. 62/047,284, filed Sep. 8, 2014.

BACKGROUND

Field Of Technology

The field of technology is data processing, or, more specifically, methods, apparatuses, and products for adjusting storage capacity in a computing system.

Description Of Related Art

The use of solid-state storage devices (e.g., flash memory) in computer systems and storage systems is increasing due to the performance of flash memory as compared to traditional disk storage devices (e.g., hard disk drives (HDDs)). Flash memory offers low-power consumption combined with fast, random (input/output) I/O accesses as compared to traditional disk storage technology. Until recently, flash memory was used primarily in embedded applications, but the use of flash memory has expanded to other applications including desktop and enterprise storage.

Embedded applications which use flash memory typically include custom operating systems and custom file systems which are designed around the advantages and limitations of flash memory. However, when using flash memory in different applications, such as in desktop and enterprise storage, these systems often have legacy operating systems and file systems which are designed and optimized for use with HDD storage technology. These legacy operating systems and file systems are not able to take full advantage of all of the characteristics of flash memory. Also, these legacy systems may reduce the effective life of flash memory if wear leveling and other techniques are not utilized to prevent frequent writes to the same flash memory locations.

Additionally, inefficiencies are often introduced when integrating host storage systems with storage devices such as flash memory. For example, host file systems typically need to maintain a mapping between a logical location of a data block, as within a file, and the physical address of that block on the storage device. However, since the physical location of a block may change due to garbage collection and other device-internal processes, flash memory storage devices also maintain a mapping between the block address as provided by the host and the actual physical address of the block.

Many storage systems utilize data deduplication to reduce the total amount of data stored. One of the simplest and fastest techniques is to deduplicate using a fixed block size. When all blocks are the same size, garbage collection, allocation, overwriting, and data integrity are all simplified. However, supporting compression in addition to deduplication increases the complexity of these tasks. For example, compressed blocks will typically have different sizes, making it more challenging to track the amount of used and free storage space.

SUMMARY

Methods, apparatus, and products for adjusting storage capacity in a computing system that includes a computing device configured to send access requests to a storage device characterized by a first storage capacity, including: reducing data; determining, in dependence upon an amount of storage capacity saved by reducing the data, an updated storage capacity for the storage device; and exporting an updated storage capacity to the computing device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
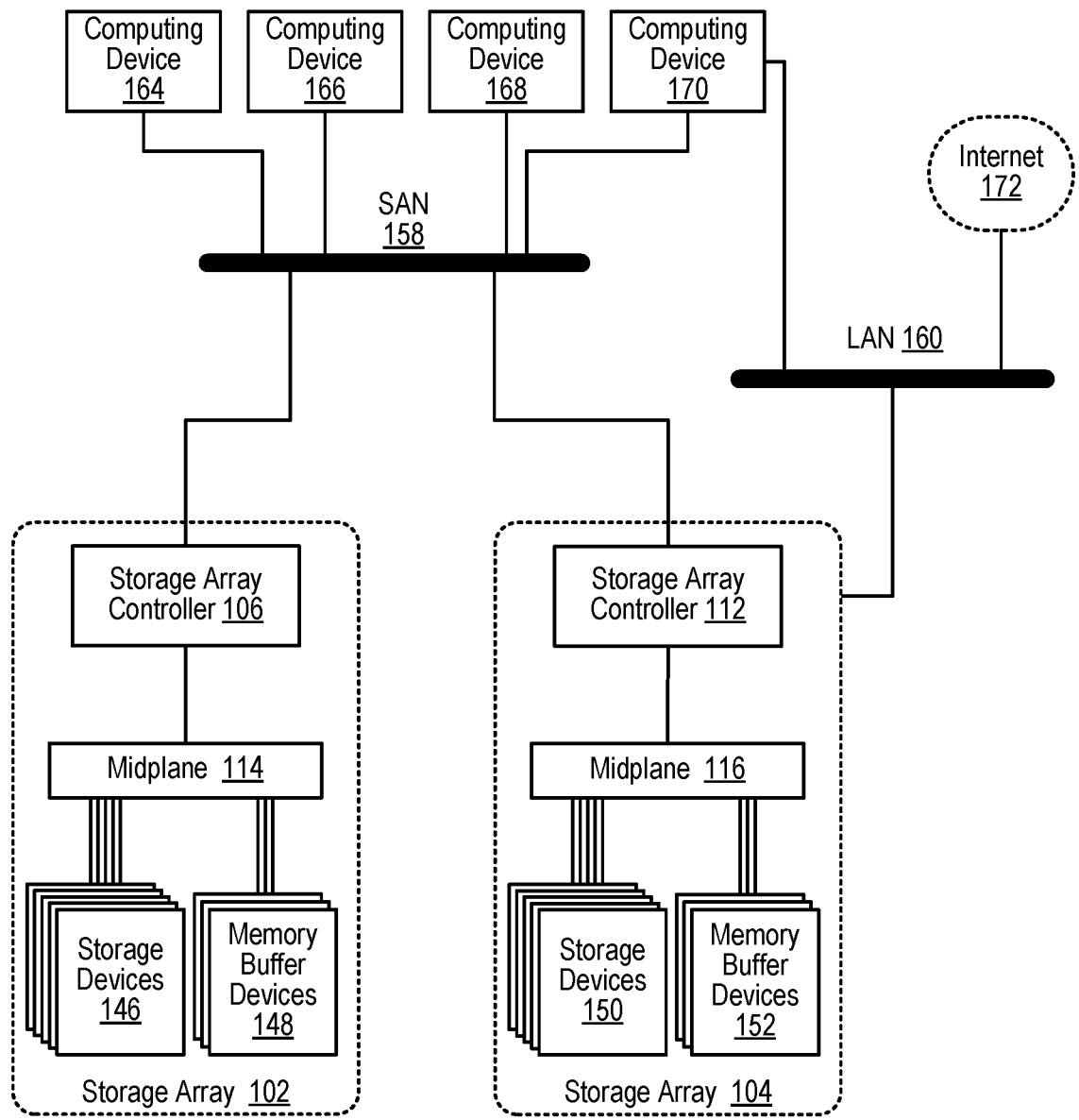
FIG. 1 sets forth a block diagram of an example system in which storage capacity may be adjusted according to embodiments of the present disclosure.

Example methods, apparatuses, and products for adjusting storage capacity in a computing system in accordance with the present disclosure are described with reference to the accompanying drawings, beginning with FIG. 1. FIG. 1 sets forth a block diagram of a system in which storage capacity may be adjusted according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The example storage devices (146, 150) depicted in FIG. 1 may be configured for adjusting storage capacity in a computing system by reducing data, determining an updated storage capacity for the storage device (146, 150) in dependence upon an amount of storage capacity saved by reducing the data, and exporting an updated storage capacity to the computing device, as will be described in greater detail below. The storage devices (146, 150) depicted in FIG. 1 may be further configured for adjusting storage capacity in a computing system by performing other steps such as, for example, compressing the data, deduplicating the data, determining the updated storage capacity for the storage device in dependence upon a predetermined amount of storage capacity held in reserve, determining the updated storage capacity for the storage device in dependence upon an anticipated reduction level, exporting the updated storage capacity to the computing device periodically, and exporting the updated storage capacity upon storing the data, as will also be described in greater detail below.

The storage array controllers (106, 112) of FIG. 1 may be useful in adjusting storage capacity in a computing system according to embodiments of the present disclosure. The storage array controllers (106, 112) may assist in adjusting storage capacity in a computing system by tracking the storage capacity of each storage device (146, 150), even as the capacity of each storage device (146, 150) changes, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Adjusting storage capacity in a computing system in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in adjusting storage capacity in a computing system according to embodiments of the present disclosure.

Figure 2:
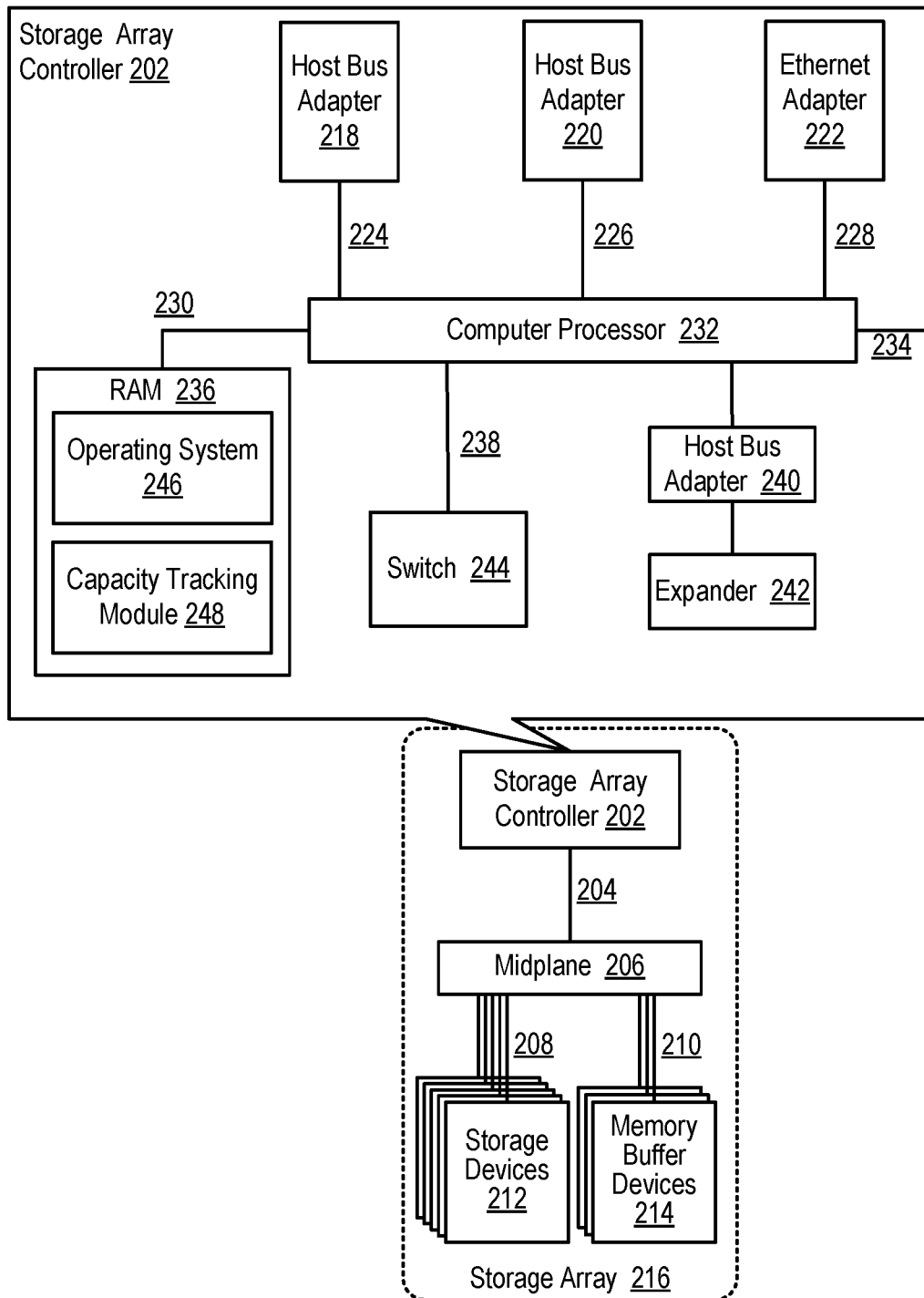
FIG. 2 sets forth a block diagram of an example storage array controller useful in adjusting storage capacity in a computing system according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for adjusting storage capacity in a computing system according to embodiments of the present disclosure include UNIX™, Linux™, Microsoft Windows™, and others as will occur to those of skill in the art. Also stored in RAM (236) is a capacity planning module (248), a module that includes computer program instructions useful in adjusting storage capacity in a computing system according to embodiments of the present disclosure. The capacity tracking module (248) may be configured to monitor the capacity of one or more storage devices (212), including receiving updated storage capacities for one or more of the storage devices (212), and further configured to perform other functions as will be described in greater detail below. Readers will appreciate that while the capacity tracking module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
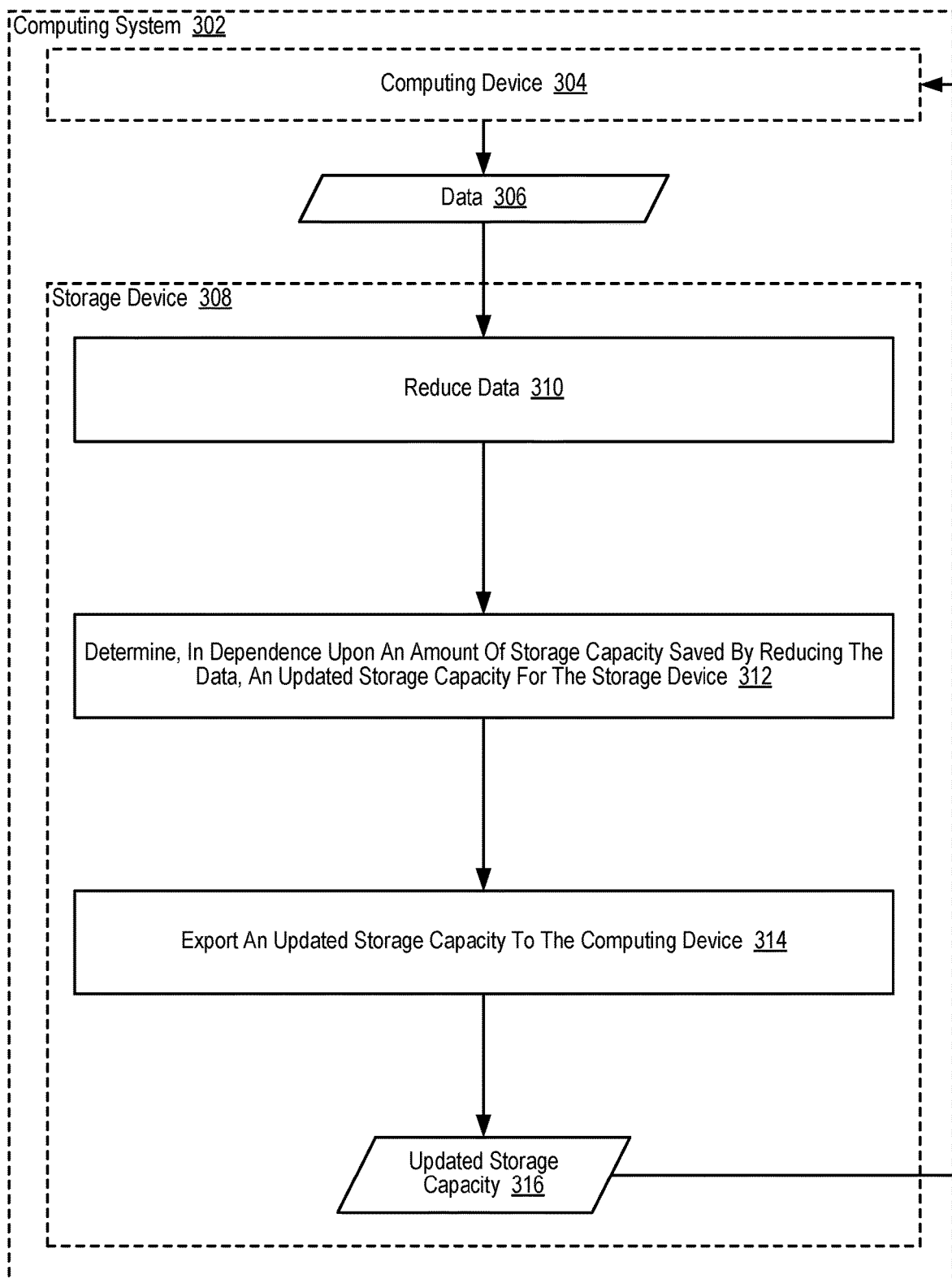
FIG. 3 sets forth a flow chart illustrating an example method for adjusting storage capacity in a computing system according to embodiments of the present disclosure.

For further explanation, FIG. 3 sets forth a flow chart illustrating an example method for adjusting storage capacity in a computing system (302) according to embodiments of the present disclosure. The computing system (302) depicted in FIG. 3 includes a computing device (304) that is configured to send access requests to a storage device (308). The computing system (302) depicted in FIG. 3 may be embodied, for example, as one or more storage arrays such as the storage arrays described above with reference to FIG. 1.

The computing device (304) of FIG. 3 may be embodied, for example, as a storage array controller such as the storage array controller described above with reference to FIG. 1 and FIG. 2. In such an example, the computing device (304) may be configured to send access requests to the storage device (308) via one or more data communications links between the computing device (304) and the storage device (308). Such access requests may include, for example, a request to write data to the storage device (308), a request to read data from the storage device (308), a request to delete data from the storage device (308), a request to perform garbage collection operations on the storage device (308), and so on.

The storage device (308) of FIG. 3 may be characterized by a first storage capacity. The first storage capacity may be expressed in terms of MB, GB, or any other appropriate unit of measure. Readers will appreciate that the 'storage capacity' of a storage device (308), as the term is used here, refers to the total storage capacity of the storage device (308), not the amount of free space within a storage device (308) at a given point in time. For example, if the storage device (308) includes a total capacity of 80 GB and the same storage device currently has 40 GB of data stored on the storage device, the storage capacity of the storage device (308) is 80 GB. The first storage capacity of the storage device (308) may be specified by the manufacturer, set during a previous iteration of the method depicted in FIG. 3, or established in other ways.

The example method depicted in FIG. 3 includes reducing (310) data (306). The data (306) may be received by the storage device (308), for example, from the computing device (304) as part of an instruction to write the data (306) to the storage device (308). Reducing (310) the data (306) may be carried out, for example, prior to storing the data (306) such that the size of the data (306) that will ultimately be stored on the storage device (308) is less than the size of the data (306) when the data (306) was sent from the computing device (304) to the storage device (308). In the example method depicted in FIG. 3, the data (306) may be reduced (310), for example, by the storage device (308) or by some other component of the computing system (302).

Consider an example in which the computing device (308) issues a request to the storage device (308) requesting that the storage device (308) stores a file that is 20 MB in size. The storage device (308) may reduce (310) the data (306), for example, by compressing the data (306). In such an example, assume that the compressed version of the file was 8 MB such that the actual amount of storage that the storage device (308) must utilize to store the compressed version of the file is 8 MB. In such a way, the size of the data (306) that will ultimately be stored on the storage device (308) is less than the expected size of the data (306) when the data (306) was sent from the computing device (304) to the storage device (308). Readers will appreciate that reducing (310) the data (306) may be carried out in other ways as will be described in more detail below.

The example method depicted in FIG. 3 also includes determining (312), in dependence upon an amount of storage capacity saved by reducing the data, an updated storage capacity (316) for the storage device (308). Determining (312) an updated storage capacity (316) for the storage device (308) may be carried out, for example, by designating the entire amount of the storage capacity saved by reducing the data as additional capacity, by designating a portion of the storage capacity saved by reducing the data as additional capacity, and so on.

Consider an example in which a storage device (308) is initially characterized by a first storage capacity of 80 GB. In such an example, assume that the computing device (304) issues a request that the storage device (308) store a database that includes 25 GB of data. Further assume that the storage device (308) is able to apply compression algorithms and deduplication algorithms that reduce (310) the database to a size of 10 GB. In such an example, the amount of storage capacity saved by reducing the data is 15 GB. As such, determining (312) the updated storage capacity (316) for the storage device (308) may be carried out by designating the entire amount of the storage capacity saved by reducing the data as additional capacity, such that the storage device (308) now presents itself as having a capacity of 95 GB. Alternatively, determining (312) the updated storage capacity (316) for the storage device (308) may be carried out by designating only a portion of the storage capacity saved by reducing the data as additional capacity, such that the storage device (308) now presents itself as having a capacity of 90 GB.

The example method depicted in FIG. 3 also includes exporting (314) an updated storage capacity (316) to the computing device (304). Exporting (314) the updated storage capacity (316) to the computing device (304) may be carried out, for example, through the use of one or more messages sent from the storage device (308) to the computing device (304). In response to receiving the updated storage capacity (316) to the computing device (304), the computing device (304) may update its view of the storage device (308) such that it treats the storage device (308) as a device whose capacity matches updated storage capacity (316).

Continuing with the example described above where the storage device (308) is initially characterized by a first storage capacity of 80 GB, the computing device (304) issues a request that the storage device (308) store a database that includes 25 GB of data, the storage device (308) is able to apply compression algorithms and deduplication algorithms that reduce (310) the database to a size of 10 GB, and the storage device (308) designates the entire amount of the storage capacity saved by reducing the data as additional capacity, the storage device (308) will export (314) an updated storage capacity (316) of 95 GB to the computing device (304). The computing device (304), which believes that it has committed 25 GB to the storage device (308), will therefore view the storage device (308) as having 70 GB of free storage. Although the examples described above relate to embodiments where storage capacities are expressed in terms of an exact value, embodiments are contemplated where storage capacities are expressed in terms of a range of values.

Figure 4:
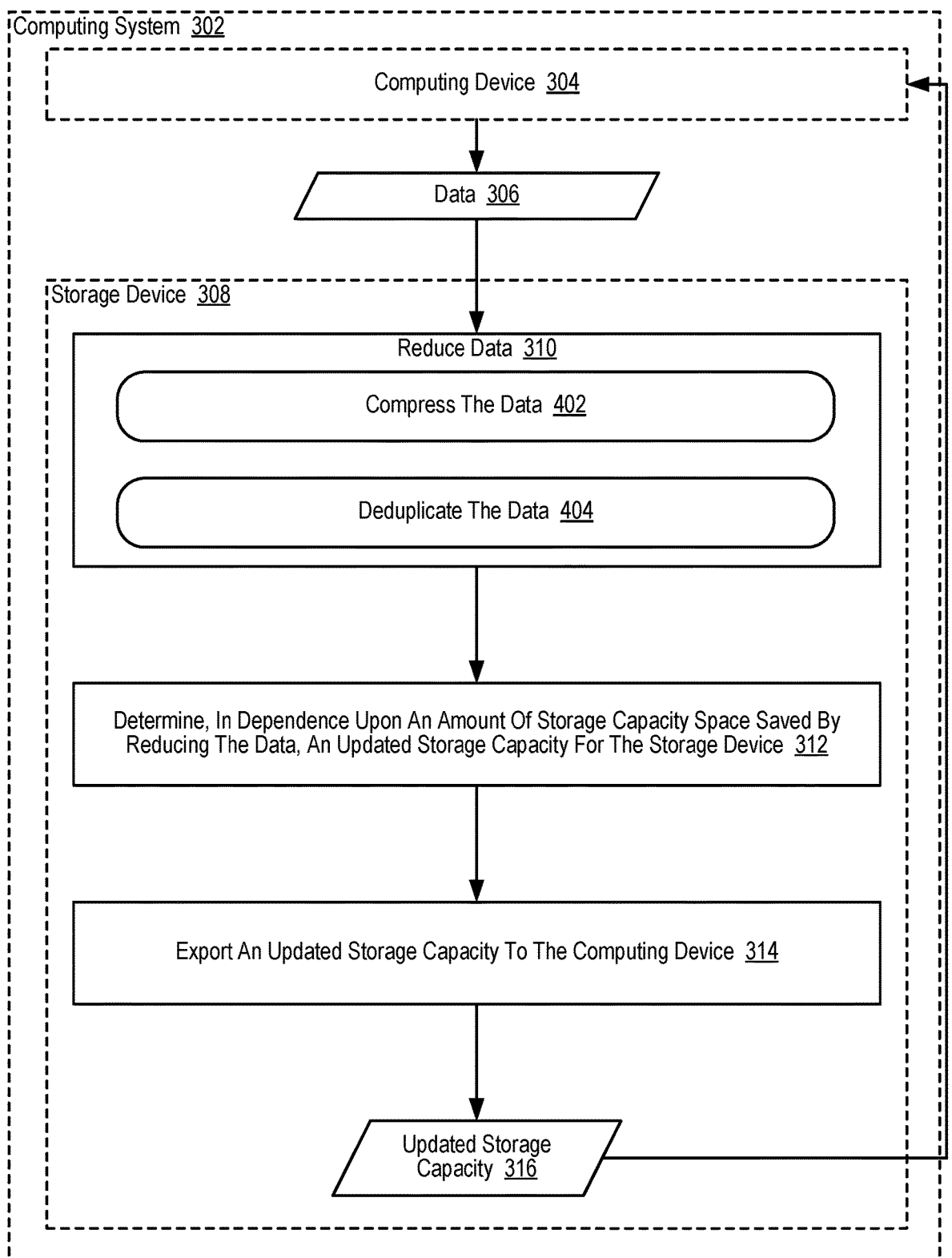
FIG. 4 sets forth a flow chart illustrating an additional example method for adjusting storage capacity in a computing system according to embodiments of the present disclosure.

For further explanation, FIG. 4 sets forth a flow chart illustrating an additional example method for adjusting storage capacity in a computing system (302) according to embodiments of the present disclosure. The example method depicted in FIG. 4 is similar to the example method depicted in FIG. 3, as the example method depicted in FIG. 4 also includes reducing (310) data (306), determining (312) an updated storage capacity (316) for the storage device (308) in dependence upon an amount of storage capacity saved by reducing the data, and exporting (314) the updated storage capacity (316) to the computing device (304).

In the example method depicted in FIG. 4, reducing (310) the data (306) can include compressing (402) the data (306). Compressing (402) the data (306) may be carried out by encoding the data (306) using fewer bits than the original representation, including by identifying and eliminating redundant bits. The storage device (308) may compress (402) the data (306) using control logic within the storage device (308) such as an application-specific integrated circuit ('ASIC'), microcontroller, microprocessor, or other form of computer hardware. Such control logic may be configured to compress (402) the data (306) using one or more compression algorithms such as, for example, LZ77, LZ78, and many others.

In the example method depicted in FIG. 4, reducing (310) the data (306) can alternatively include deduplicating (404) the data (306). Deduplicating (404) the data (306) may be carried out by eliminating duplicate copies of repeating data. The storage device (308) may deduplicate (404) the data (306) using control logic within the storage device (308) such as an ASIC, microcontroller, microprocessor, or other form of computer hardware. Such control logic may be configured to retain signatures for various data elements already stored on the storage device (308), and further configured generate and compare signatures for data to be written to the storage device (308) to the signatures for various data elements already stored on the storage device (308), in order to determine when incoming data is a duplicate of data elements already stored on the storage device (308).

Although the examples described above are related to compressing (402) the data (306) and deduplicating (404) the data (306), readers will appreciate that other techniques (e.g., thin provisioning) may be utilized to reduce (310) the data (306). Furthermore, embodiments of the present disclosure are not limited to using a single technique, as multiple techniques may be utilized in combination.

Figure 5:
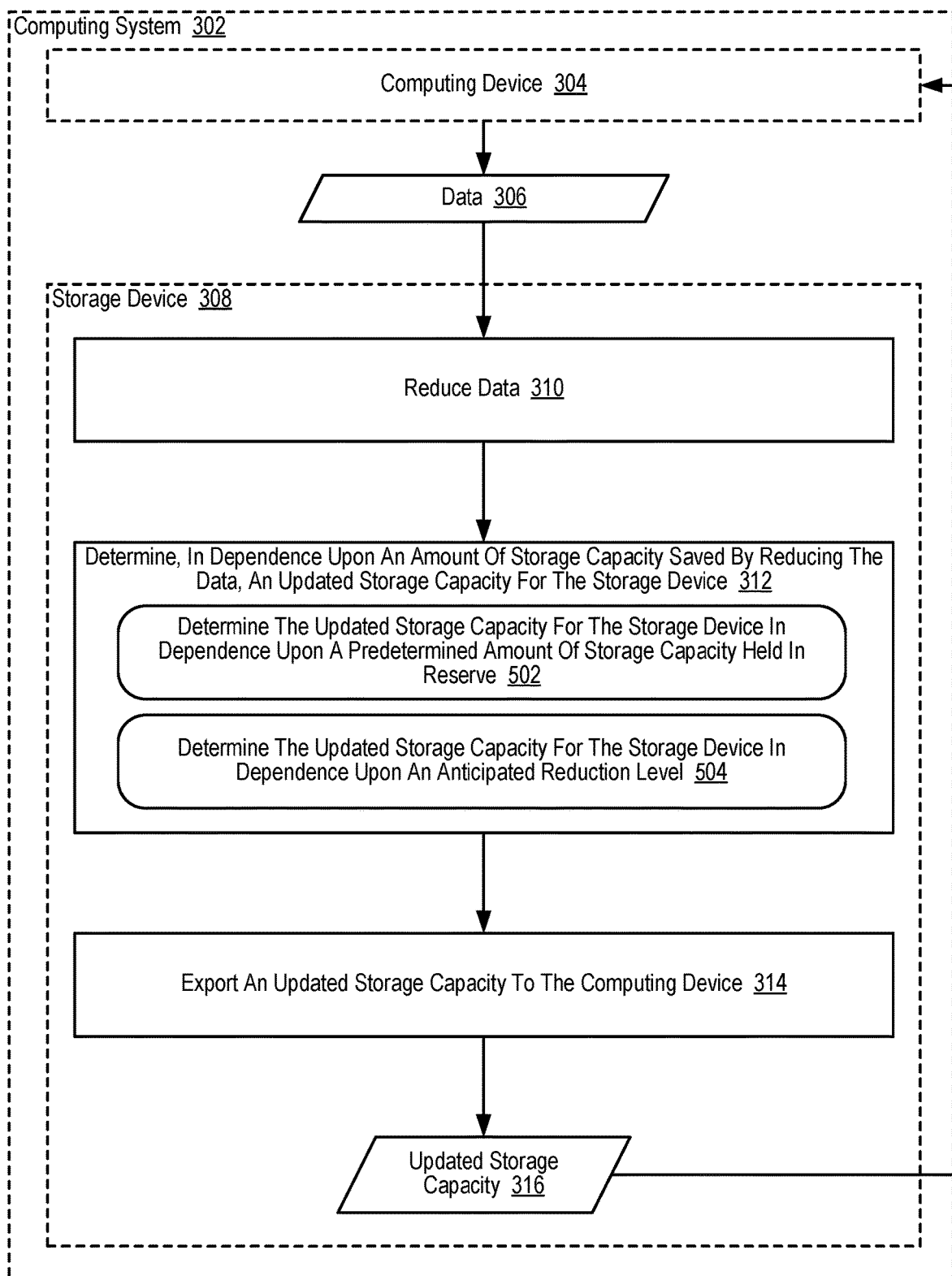
FIG. 5 sets forth a flow chart illustrating an additional example method for adjusting storage capacity in a computing system according to embodiments of the present disclosure.

For further explanation, FIG. 5 sets forth a flow chart illustrating an additional example method for adjusting storage capacity in a computing system (302) according to embodiments of the present disclosure. The example method depicted in FIG. 5 is similar to the example method depicted in FIG. 3, as the example method depicted in FIG. 5 also includes reducing (310) data (306), determining (312) an updated storage capacity (316) for the storage device (308) in dependence upon an amount of storage capacity saved by reducing the data, and exporting (314) the updated storage capacity (316) to the computing device (304).

In the example method depicted in FIG. 5, determining (312) an updated storage capacity (316) for the storage device (308) can include determining (502) the updated storage capacity (316) for the storage device (308) in dependence upon a predetermined amount of storage capacity held in reserve. The storage device (308) may hold a predetermined amount of storage capacity in reserve in order to avoid over representing the capacity of the storage device (308), or for some other purpose. Determining (502) the updated storage capacity (316) for the storage device (308) in dependence upon a predetermined amount of storage capacity held in reserve may be carried out, for example, by determining (312) the updated storage capacity (316) for the storage device (308) as described above and subtracting the predetermined amount of storage capacity held in reserve from the updated storage capacity (316) that is ultimately exported (314) to the computing device (304).

Consider the example described above where the storage device (308) is initially characterized by a first storage capacity of 80 GB, the computing device (304) issues a request that the storage device (308) store a database that includes 25 GB of data, the storage device (308) is able to apply compression algorithms and deduplication algorithms that reduce (310) the database to a size of 10 GB, and the storage device (308) designates the entire amount of the storage capacity saved by reducing the data as additional capacity. In such an example, the storage device (308) would export (314) an updated storage capacity (316) of 95 GB to the computing device (304) in the absence of the storage device (308) holding a predetermined amount of storage capacity in reserve. In an embodiment where the storage device (308) does hold a predetermined amount of storage capacity in reserve, however, the storage device (308) would export (314) an updated storage capacity (316) that is reduced by predetermined amount of storage capacity in reserve. If the predetermined amount of storage capacity to be held in reserve was 10 GB, for example, the storage device (308) would export (314) an updated storage capacity (316) of 85 GB to the computing device (304).

In the example method depicted in FIG. 5, determining (312) an updated storage capacity (316) for the storage device (308) can alternatively include determining (504) the updated storage capacity (316) for the storage device (308) in dependence upon an anticipated reduction level. The anticipated reduction level can represent the extent to which future commitments of data to the storage device are expected to be reduced. The anticipated reduction level may be determined, for example, based on the average rate at which all data currently stored on the storage device (308) has been reduced (310).

Consider the example described above where the storage device (308) is initially characterized by a first storage capacity of 80 GB, the computing device (304) issues a request that the storage device (308) store a database that includes 25 GB of data, and the storage device (308) is able to apply compression algorithms and deduplication algorithms that reduce (310) the database to a size of 10 GB. In such an example, the storage device (308) may assume that data to be written to the storage device (308) may reduce at a similar rate (e.g., 25 GB of data will be reduced to 10 GB of data). That is, the storage device (308) sets its anticipated reduction level by assuming that the storage device (308) is able to reduce (310) all data received in the future to 40% of its original size. In such an example, the storage device (308) would determine (504) the updated storage capacity (316) in dependence upon an anticipated reduction level by assuming that the storage device (308) is able to reduce (310) all data received in the future to 40% of its original size, meaning that the storage device (308) could export (314) an updated storage capacity (316) of 200 GB to the computing device (304).

Readers will appreciate that in alternative embodiments, the anticipated reduction level may be determined using other information. For example, the anticipated reduction level may be determined based on known characteristics of the data (306), where data of a first type is expected to reduce at a first rate and data of second type is expected to reduce at a second rate. In another embodiment, the anticipated reduction level may be determined based on known characteristics of the storage device (308), where a first type of storage device is expected to reduce data at a first rate and second type of storage device is expected to reduce data at a second rate. In another embodiment, the anticipated reduction level may be determined based on an amount of data stored on the storage device (308) as incoming data may be more frequently deduplicated when the storage device (308) is full, whereas incoming data may be less frequently deduplicated when the storage device (308) is empty. Readers will appreciate that other techniques may be implemented to determine the anticipated reduction level, and that techniques (including those described above) may be used in combination.

Figure 6:
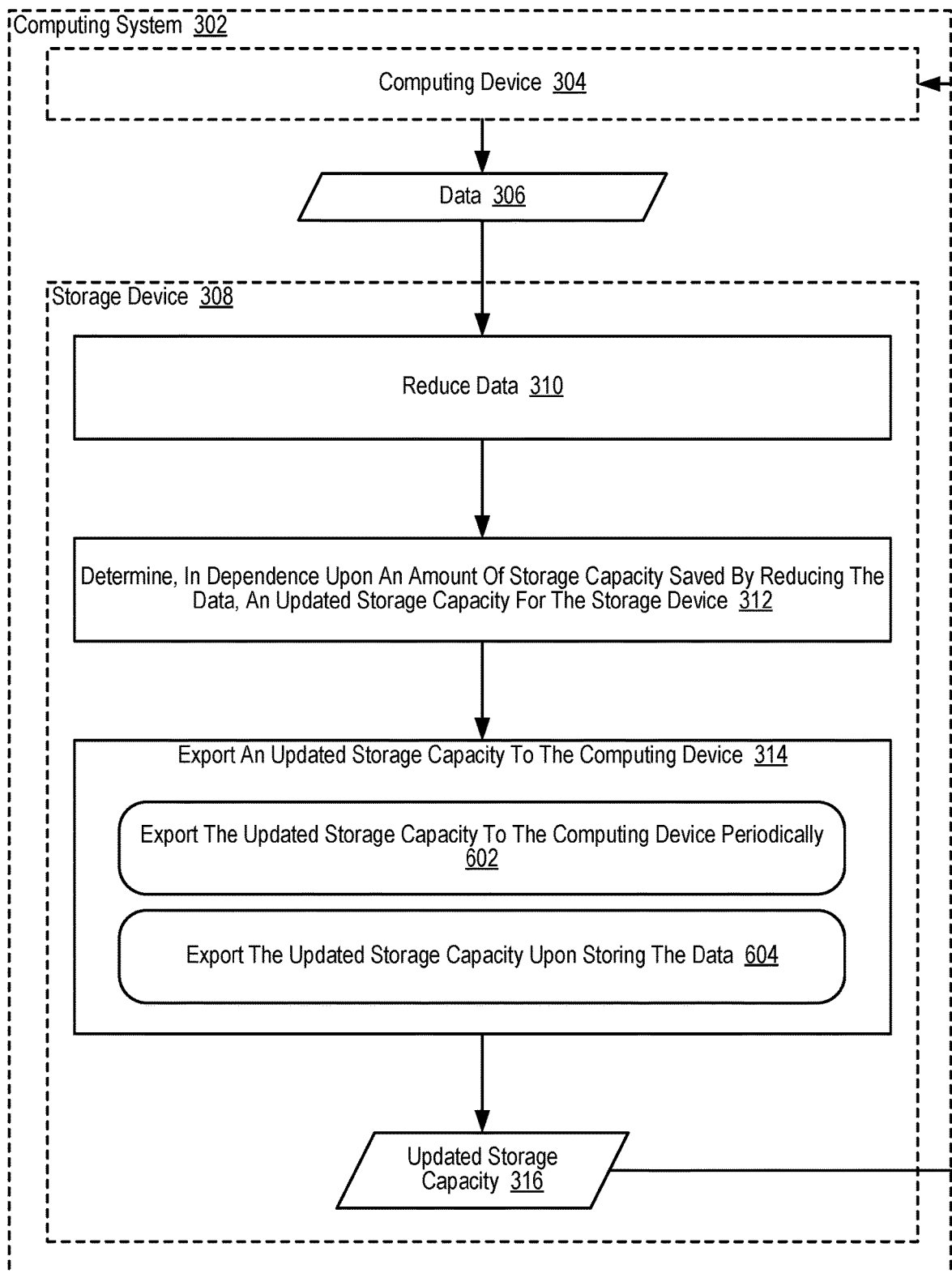
FIG. 6 sets forth a flow chart illustrating an additional example method for adjusting storage capacity in a computing system according to embodiments of the present disclosure.

For further explanation, FIG. 6 sets forth a flow chart illustrating an additional example method for adjusting storage capacity in a computing system (302) according to embodiments of the present disclosure. The example method depicted in FIG. 6 is similar to the example method depicted in FIG. 3, as the example method depicted in FIG. 6 also includes reducing (310) data (306), determining (312) an updated storage capacity (316) for the storage device (308) in dependence upon an amount of storage capacity saved by reducing the data, and exporting (314) the updated storage capacity (316) to the computing device (304).

In the example method depicted in FIG. 6, exporting (314) the updated storage capacity (316) to the computing device (304) can include exporting (602) the updated storage capacity (316) to the computing device (304) periodically. Exporting (602) the updated storage capacity (316) to the computing device (304) periodically may be carried out, for example, by exporting (602) the updated storage capacity (316) to the computing device (304) upon the expiration of a predetermined period of time, by exporting (602) the updated storage capacity (316) to the computing device (304) a predetermined number of times during a predetermined time period, by exporting (602) the updated storage capacity (316) to the computing device (304) according to a predetermined schedule, and so on.

In the example method depicted in FIG. 6, exporting (314) the updated storage capacity (316) to the computing device (304) can alternatively include exporting (604) the updated storage capacity (316) upon storing the data (306). In such an example, each time data is written to the storage device (308), the storage device (308) export (604) the updated storage capacity (316) so that the computing device (304) has an accurate view of the storage device's (308) capacity each time capacity is utilized.

Readers will appreciate that exporting (314) the updated storage capacity (316) to the computing device (304) may occur according to other criteria. For example, the updated storage capacity (316) may be exported (314) to the computing device (304) when the storage capacity changes by a predetermined amount, the updated storage capacity (316) may be exported (314) to the computing device (304) when the storage capacity changes by a predetermined percentage, the updated storage capacity (316) may be exported (314) to the computing device (304) in response to a user request, and so on. Readers will appreciate that all such embodiments are within the scope of the present disclosure.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

Although the example described above describe embodiments where various actions are described as occurring within a certain order, no particular ordering of the steps are required. In fact, it will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
    transmitting, by a processing device of a storage controller operatively coupled to a plurality of storage devices, data to be stored in a storage device of the plurality of storage devices of a storage system, wherein the storage system is characterized by a total storage capacity;
    receiving, by the processing device from the storage device, an updated storage capacity of the storage device that is based on an amount of storage capacity saved by the storage device reducing the data;
    determining, by the processing device, an updated total storage capacity for the storage system based on the updated storage capacity of the storage device; and
    representing, by the processing device, the storage system as having the updated total storage capacity.

2. The method of claim 1 wherein reducing the data includes deduplicating the data.

3. The method of claim 1, wherein determining the updated total storage capacity for the storage system further comprises:
    determining the updated storage capacity for the storage device based on another amount of storage capacity held in reserve.

4. The method of claim 1, wherein determining the updated total storage capacity for the storage system further comprises:
    determining the updated storage capacity for the storage system based on an anticipated reduction level.

5. The method of claim 1, wherein representing the updated total storage capacity provided by the storage system further comprises:
    representing the updated total storage capacity provided by the storage system periodically.

6. The method of claim 1 wherein representing the updated total storage capacity provided by the storage system further comprises:
    representing the updated total storage capacity provided by the storage system upon storing the data.

7. The method of claim 1, wherein reducing the data comprises compressing the data using a compression algorithm.

8. The method of claim 1, wherein the updated storage capacity comprises a portion of the amount of storage capacity that is less than a total amount of storage capacity saved by reducing the data.

9. A storage system comprising:
    a plurality of storage devices; and
    a storage controller comprising a processor operatively coupled to the plurality of storage devices configured to:
    transmit data to be stored in a storage device of the plurality of storage devices of the storage system, wherein the storage system is characterized by a total storage capacity;
    receive, from the storage device, an updated storage capacity of the storage device that is based on an amount of storage capacity saved by the storage device reducing the data;
    determine an updated total storage capacity for the storage system based on the updated storage capacity of the storage device; and
    represent the storage system as having the updated total storage capacity.

10. The storage system of claim 9, wherein reducing the data comprises deduplicating the data.

11. The storage system of claim 9, wherein to determine the updated total storage capacity for the storage system, the processor is further configured to:
    determine the updated storage capacity for the storage device based on another amount of storage capacity held in reserve.

12. The storage system of claim 9, wherein to determine the updated total storage capacity for the storage system, the processor is further configured to:
    determine the updated storage capacity for the storage system based on an anticipated reduction level.

13. The storage system of claim 9, wherein to represent the updated total storage capacity provided by the storage system, the processor is further configured to:
    represent the updated total storage capacity provided by the storage system periodically.

14. The storage system of claim 9, wherein to represent the updated total storage capacity provided by the storage system, the processor is further configured to:
    represent the updated total storage capacity provided by the storage system upon storing the data.

15. The storage system of claim 9, wherein reducing the data comprises compressing the data using a compression algorithm.

16. A non-transitory computer readable storage medium storing instructions which, when executed, cause a processor of a storage controller to:
- transmit data to be stored in a storage device of a plurality of storage devices of a storage system, wherein the storage system is characterized by a total storage capacity;
- receive, from the storage device, an updated storage capacity of the storage device that is based on an amount of storage capacity saved by the storage device reducing the data;
- determine an updated total storage capacity for the storage system based on the updated storage capacity of the storage device; and
- represent the storage system as having the updated total storage capacity.

17. The non-transitory computer readable storage medium of claim 16 wherein reducing the data comprises deduplicating the data.

18. The non-transitory computer readable storage medium of claim 16, wherein to determine the updated total storage capacity for the storage system, the processor is configured to:
- determine the updated storage capacity for the storage device based on another amount of storage capacity held in reserve.

19. The non-transitory computer readable storage medium of claim 16, wherein to determine the updated total storage capacity for the storage system, the processor is configured to:
- determine the updated storage capacity for the storage system based on an anticipated reduction level.

20. The non-transitory computer readable storage medium of claim 16, wherein to represent the updated total storage capacity provided by the storage system, the processor is configured to:
- represent the updated total storage capacity provided by the storage system periodically.

* * * * *